United States Patent [19]
Lai

[11] Patent Number: 5,314,285
[45] Date of Patent: May 24, 1994

[54] AUTOMATIC CONTROLLED MULTI-LEVEL STORAGE SYSTEM

[75] Inventor: Nelson Lai, Taipei, Taiwan

[73] Assignee: Necer International Co., Ltd., Taipei, Taiwan

[21] Appl. No.: 4,125

[22] Filed: Jan. 13, 1993

[51] Int. Cl.⁵ ............................................. F04H 6/12
[52] U.S. Cl. ................................... 414/236; 414/239; 414/280
[58] Field of Search ............... 414/234, 236, 237, 239, 414/240, 609, 277, 278, 280, 286

[56] References Cited

U.S. PATENT DOCUMENTS

| | | | |
|---|---|---|---|
| 1,605,220 | 11/1926 | Cuvillier et al. | 414/234 |
| 2,412,009 | 12/1946 | Rickland | 414/239 |
| 3,079,015 | 2/1963 | Sinclair et al. | 414/239 |
| 3,190,467 | 6/1965 | English | 414/234 |
| 3,240,364 | 3/1966 | Kapnek et al. | 414/240 X |
| 4,768,914 | 9/1988 | Sing | 414/237 |
| 4,936,730 | 6/1990 | Morioka | 414/239 |
| 5,024,571 | 6/1991 | Shahar et al. | 414/239 X |
| 5,032,053 | 7/1991 | Krieg | 414/278 |
| 5,039,269 | 8/1991 | Yen | 414/236 |
| 5,066,187 | 11/1991 | Hammer | 414/239 X |
| 5,069,592 | 12/1991 | Galperin | 414/240 |

Primary Examiner—David A. Bucci
Attorney, Agent, or Firm—Jacobson, Price, Holman & Stern

[57] ABSTRACT

Disclosed is an automatic controlled multi-level storage system having a bottom access level, a plurality of cargo storage levels vertically spaced above the access level, and a central elevator space vertically disposed through each level, each level having an array of contiguous spaces mounted with four-way or two-way wheel assemblies longitudinally and/or transversely and pairs of parallel rails intersected with one another longitudinally and transversely for moving individual storage platforms and cargo thereon, the elevator space being installed with an elevator for raising and lowering individual storage platforms and cargo thereon to a desired level, the elevator having two register spaces vertically spaced, each resister space having four-way wheel assemblies and mechanical arms for moving each time an individual storage platform to either level, the access level having platform storage devices for storing individual storage platforms.

7 Claims, 12 Drawing Sheets

AUTOMATIC CONTROLLED MULTI-LEVEL STORAGE SYSTEM

BACKGROUND OF THE INVENTION

The present invention relates to a storage system, and more particularly to an automatic controlled multi-level storage system controlled by a programmed computer for the compact storage and rapid retrieval of storage items, such as motor vehicles, cargo containers, etc.

Because the cost of land in downtown areas and industrial areas is expensive, the effective utilization of space for storage should be maximized. Various multi-level storage systems have been proposed to minimize the amount of land for storing more automobiles, cargo containers, and many other items of cargo. In U.S. Pat. No. 4,768,914, there is disclosed a storage system for moving and storing cargo such as automobiles, cargo containers and the like. The storage system comprises an array of contiguous storage spaces on each level within a structure, each storage space being provided with a first means for supporting and moving a storage platform back and forth in longitudinal direction, and a second means for supporting and moving a storage platform from the side in a transverse direction, and elevator means for raising and lowering any of a plurality of storage platforms and cargo thereon to a desired level. However, this storage system is still not satisfactory in function. Because a number of heavy powered jacks are used and installed in the storage space below the first means, second means and elevator means, the installation process of the storage system is complicated, and the building structure must be reinforced to support the heavy load. The storage system further comprises shift means for selectively bringing one of the supporting and moving means into and out of operative engagement and support of corresponding pair of guide rails, so that one of the first and second supporting and moving means is in supportive contact with one of a plurality of storage platforms at any time when the platform occupies the corresponding storage space. The arrangement cannot absolutely eliminate the problem of engagement errors. Any tiny engagement error may cause vibration of a storage platform as it is moved from one storage space to another. The storage system further comprises platform storage means for accommodating storage platforms when they are not positioned in the storage space. The platform storage means comprises at least one storage well wherein the storage platforms may be placed in a vertical stack, means for raising and lowering the stack so that the topmost of stored storage platforms may be horizontally aligned with at least one level of the building structure, and means for removing the topmost platform from and returning any of storage platform to the stack in the at least one storage well. Because a tray hoist system and hydraulic cylinders are used as means for moving and storing storage platforms in the storage well, effective operation can be achieved only when storage platforms are precisely positioned. Any positioning error of storage platforms (due to the aforesaid engagement errors) may cause a catching failure. Further, because storage platforms are to be placed in a vertical stack, a great friction resistance will be produced and transmitted to the hydraulic cylinders when one storage platform is placed on or retrieved from another, thereby shortening the service life of the hydraulic cylinders.

SUMMARY OF THE INVENTION

The present invention eliminates the aforesaid disadvantages. According to the preferred embodiment of the present invention, the automatic controlled multi-level storage system comprises a storage structure having a bottom access level, at least one storage level vertically spaced above the access level, and an elevator space through each level. Each storage level has an array of cargo storage spaces longitudinally and transversely aligned around the elevator space and mounted with four-way or two-way wheel assemblies longitudinally and/or transversely and pairs of parallel rails intersected with one another longitudinally and transversely for moving individually storage platforms and cargo thereon. The access level has platform storage spaces and conveying spaces longitudinally and transversely aligned around the elevator space. Each conveying space comprises four-way wheel assemblies and pairs arranged in longitudinal direction and/or transverse direction and pairs of parallel rails longitudinally and transversely intersected with one another for moving individual storage platforms and cargo thereon. The elevator space has a turning gear at the bottom controlled to turn an individual storage platform and cargo thereon in a circle to a desired direction, and elevator means controlled to raise and lower individual storage platforms to a desired level or retrieve them from either level to the access level. The elevator means has two register spaces, each of which having mechanical arms for moving an individual storage platform from the respective register space to an adjacent space on either level or from either level into the respective register space. All the driving and actuating elements are controlled through a programmed computer.

Therefore, according to one object of the present invention, an individual storage platforms can be stably and continuously moved in longitudinal and transverse directions on either level by the respective four-way and/or two-way wheel assemblies and the guide of the pairs of parallel rails by means of the control of the programmed computer.

According to another object of the present invention, an individual storage platform can be accurately moved from either register space of the elevator means to either level or from either level to either register space by the mechanical arms on either register space by means of the control of the programmed computer.

According to still another object of the present invention, any location adjacent to either conveying space can be defined as cargo entrance/exit for efficient storage and retrieval of cargo elements.

According to still another object of the present invention, an individual storage platform with cargo thereon can be turned by the turning gear to a desired direction for quick storing or retrieving.

According to still another object of the present invention, the pairs of parallel rails on each level are intersected with one another by switching sections, each switching section having peripheral walls respectively terminated to corresponding pairs of parallel rails, and therefore individual storage platforms can be smoothly and accurately guided from one space to another without causing a transferring error.

According to still another object of the present invention, each platform storage space on the access level is equipped with two-way wheel assemblies and a platform storage device lifted by hydraulic cylinders and controlled by the programmed computer for accommodating storage platforms. The platform storage device has horizontal platform storage spaces spaced vertically by horizontal ribs each for accommodating an individual storage platform.

DETAILED DESCRIPTION OF THE PREFERRED EMBODIMENT

Figure 1:
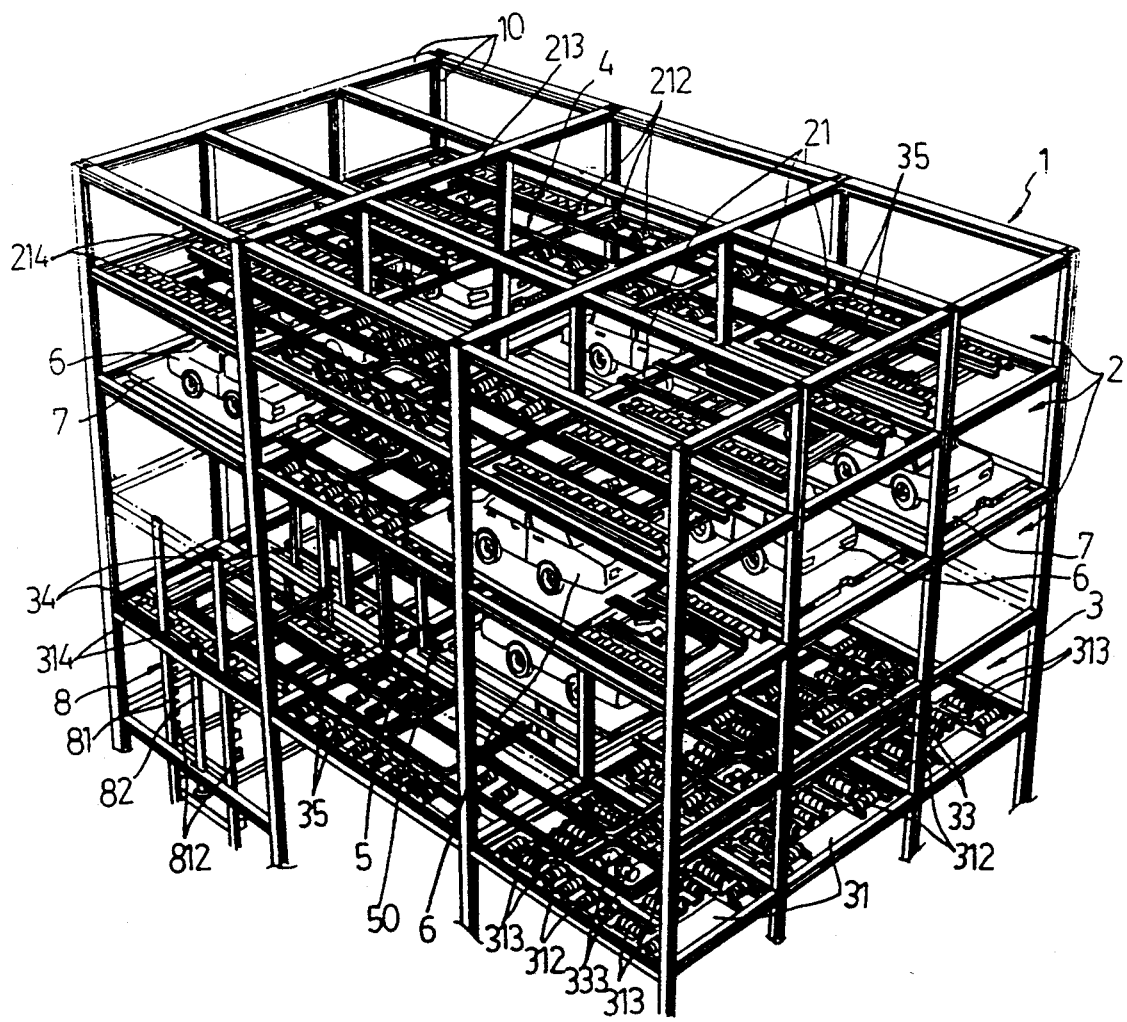
FIG. 1 is a perspective elevational view of the building structure of the automatic controlled multi-level storage system of the preferred embodiment of the present invention.

Referring to FIG. 1, there is shown a storage structure in accordance with the present invention, which is constructed from structural steel elements 10. The storage structure comprises a plurality of independent levels including a plurality of storage levels 2 for storing cargo such as vehicles, cargo containers and the like and one access level 3 through which cargo is moved into, stored or moved out of any one of the storage space on each of the storage levels. There are contiguous cargo storage spaces 21 on each of the storage levels 2, and platform storage spaces 34 and conveying spaces 31 on the access level 3. The cargo storage spaces 21, platform storage spaces 34 and conveying spaces 31 are respectively disposed around an elevator space 4, which is made vertically through the storage structure and through which elevator means 5 is moved up and down to raise or lower platforms and cargo thereon.

Cargo to be stored, exemplified by automobile 6 is moved onto an individual storage platform 7 supported on the longitudinally and/or transversely arranged four-way wheel assemblies 312,313 of a horizontal shifting mechanism. By means of the control of a programmed computer, the storage platform 7 with the automobile 6 thereon is moved by the four-way wheel assemblies 312,313 to a conveying space 31 adjacent to the elevator space 4. The storage platform 7 with the automobile 6 thereon is then moved to the elevator means 5 by a mechanical arm 50. When loaded, the elevator means 5 is raised to a desired storage level 2, and then the storage platform 7 with the automobile 6 thereon is moved to an adjacent cargo storage space 21 on the selected storage level 2 by the mechanical arm 50 of the elevator means 5. The four-way wheel assemblies 212 or two-way wheel assemblies 214 of a horizontal shifting mechanism in the selected storage level 2 are operated by means of the control of the programmed computer to move the storage platform 7 with the automobile 6 thereon to a desired cargo storage space 21.

Figure 2:
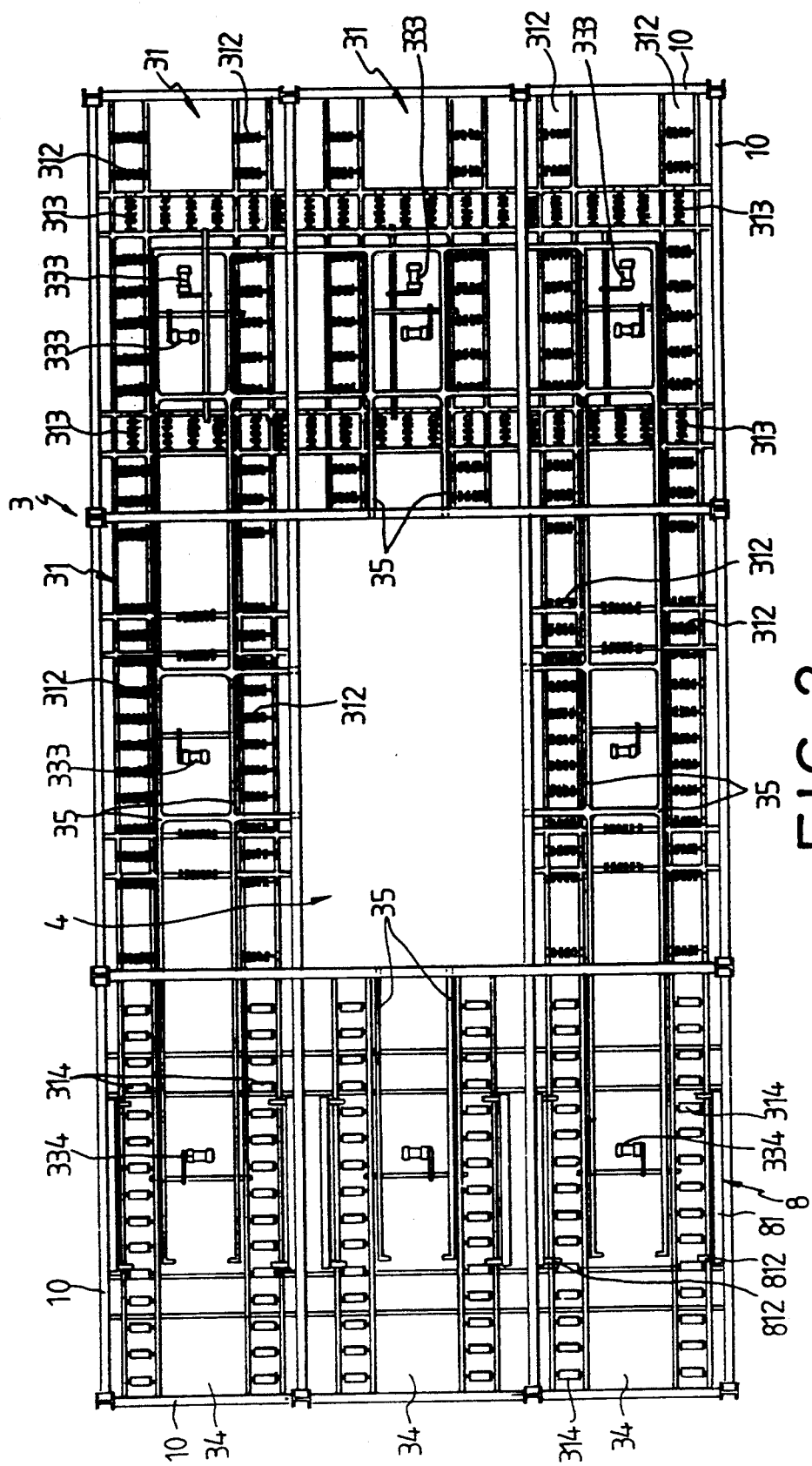
FIG. 2 is a floor plan view of the access level of the storage system.

Referring to FIG. 2, wherein illustrates a plan view of the access level 3 of the storage structure. The access level 3 has two opposite conveying spaces 31 at two opposite sides of the elevator space 4, which each comprises a plurality of four-way wheel assemblies 312 arranged on the structural steels 10 in longitudinal direction and controlled by the aforesaid programmed computer through a respective driving mechanism 333 to move individual storage platforms in longitudinal direction, another three conveying spaces 31 at one side of the aforesaid two opposite conveying space and the elevator space 4, which each comprises a plurality of four-way wheel assemblies 312 and 313 arranged on the structural steels 10 and alternatively controlled by the programmed computer through a respective driving mechanism 333 to move a storage platform in longitudinal or transverse direction, and three platform storage spaces 34 at an opposite side relative to the elevator space 4 and the conveying spaces 31, which each comprises a plurality of two-way wheel assemblies 314 controlled by the programmed computer through a respective driving mechanism 334 to move individual storage platforms in longitudinal direction. The number of the platform storage spaces 34 may be determined according to different requirements, and an additional conveying space or cargo storage space may be installed, in lieu of a platform storage space, to make up each empty space.

Figure 5:
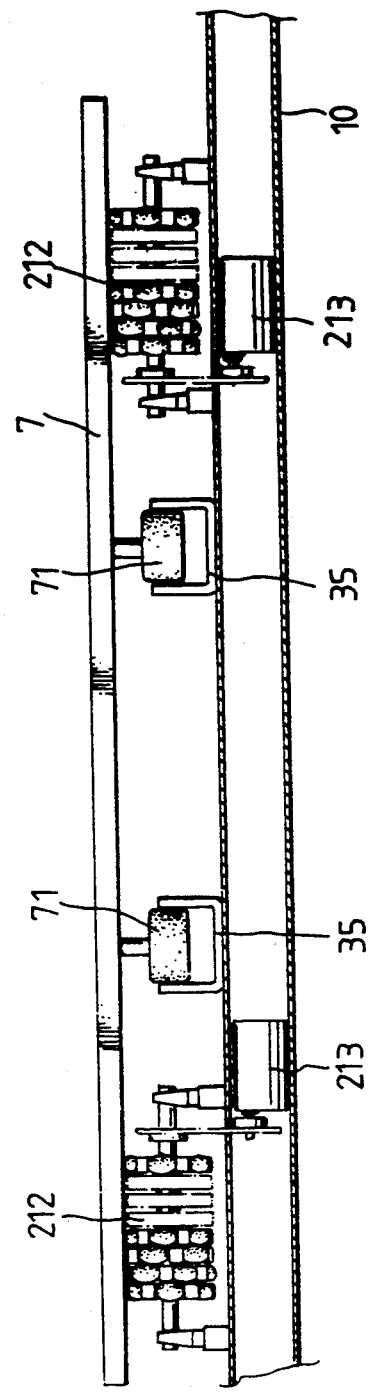
FIG. 5 is a sectional elevation showing a storage platform positioned on either space inside the storage structure.

Referring to FIG. 2 again, pairs of parallel rails 35 are arranged on each space 31 or 34 of the access level 3 longitudinally and transversely for supporting and guiding the bottom horizontal rollers 71 of an individual storage platform 7 (see FIG. 5). Platform storage racks 81 with equally spaced horizontal ribs 812 are respectively made inside each platform storage space 34 for storing storage platforms 7.

Figure 3:
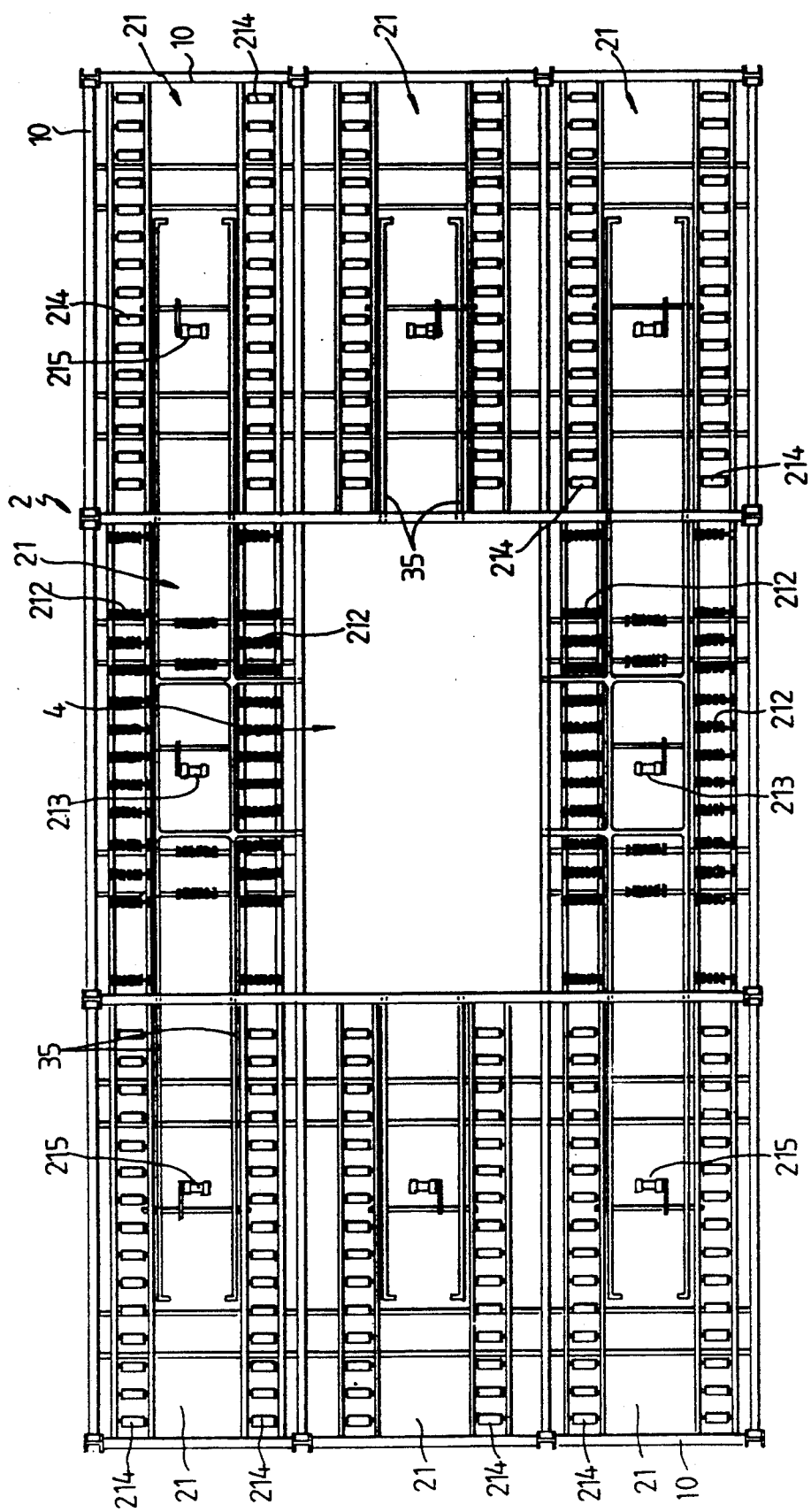
FIG. 3 is a floor plan view of one storage level of the storage system.

Referring to FIG. 3, there is shown a plan view of one storage level 2. As illustrated, two opposite cargo storage spaces 21 are disposed adjacent to the elevator space 4 at two opposite sides, which each comprise a plurality of four-way wheel assemblies 212 arranged on the structural steel elements 10 in longitudinal direction controlled by the aforesaid programmed computer through a respective driving mechanism 213 to move storage platforms 7 in longitudinal direction; there are also three contiguous cargo storage spaces 21 arranged on each of the two opposite sides of the aforesaid two opposite cargo storage spaces 21 and the elevator space 4, which each comprises a plurality of two-way wheel assemblies 214 controlled by the programmed computer through a respective driving mechanism 215 to move storage platforms 7 in longitudinal direction. Parallel rails 35 are also respectively arranged on each cargo storage space 21 of each storage level 2 for supporting and guiding the bottom horizontal rollers 71 of each individual storage platform 7 (see FIG. 5).

Figure 4:
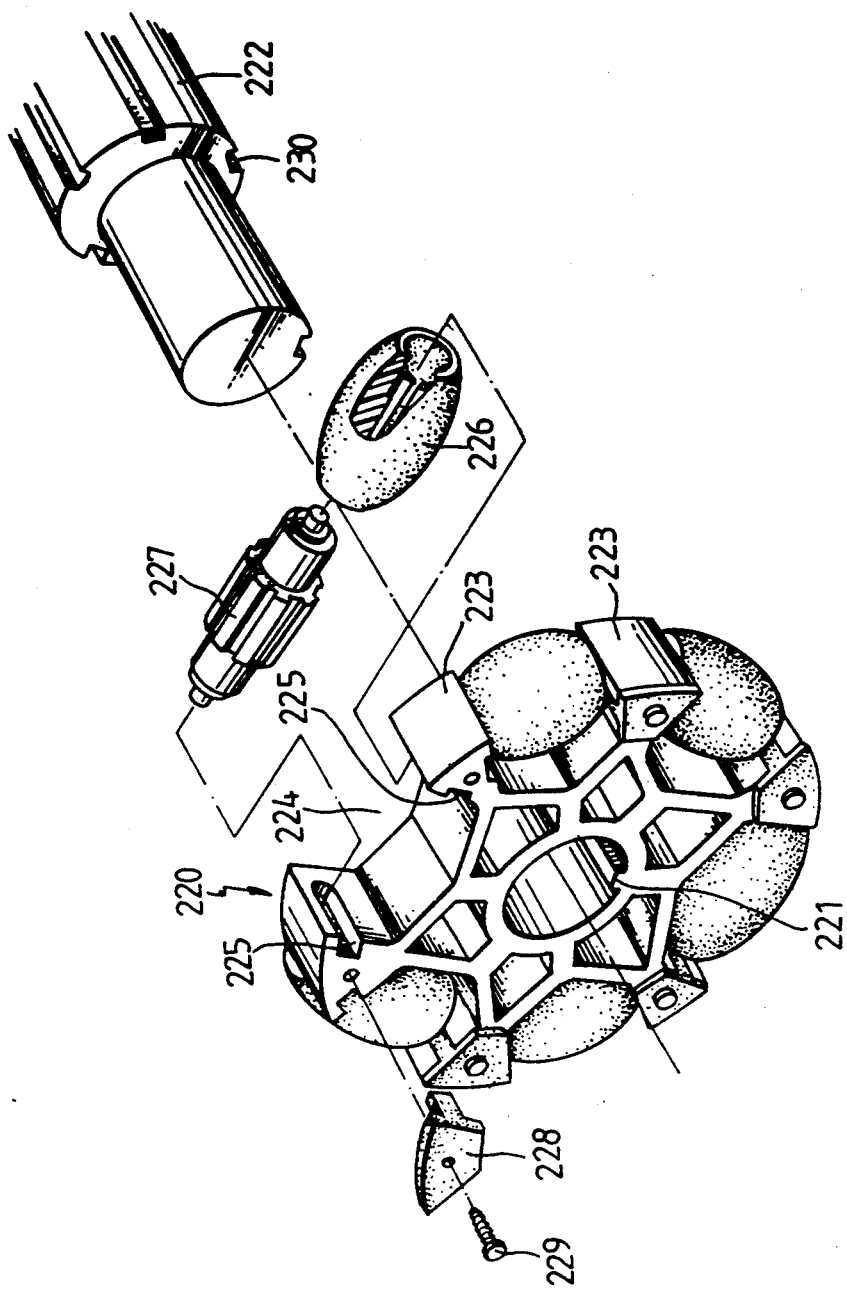
FIG. 4 is an exploded view of a four-way wheel assembly according to the present invention.

Referring to FIG. 4, there is shown an exploded view of a four-way wheel assembly 212, 312 or 313 according to the present invention. The four-way wheel assembly comprises a plurality of four-way wheels 220 respectively mounted on a central shaft 222. The four-way wheel 220 comprises a key 221 on the inside, which is locked in a respective key groove 230 of the central shaft 222 for positioning, a plurality of recesses 224 equiangularly spaced by ribs 223 around the border thereof, each recess 224 having two opposite grooves 225, a plurality of revolving axles 227 respectively covered with a rubber cylinder 226 and revolvably positioned on either recess 224, each revolving axle 227 having two opposite ends respectively inserted into the two opposite grooves 225 on either recess 224, and locating plates 228 respectively fastened to the ribs 223 by screws 229 to hold the revolving axles 227 with rubber coverings 226 thereon in the recesses 224. The four-way wheel 220 may be rotated by the central shaft 222 to move the platform supported thereon in one direction. The four-way wheel 220 may be locked in place for permitting the platform thereon to be supported on either rubber cylinder 226 and moved horizontally in the revolving direction of the rubber cylinder 226, i.e., in the direction perpendicular to the revolving direction of the four-way wheel 220.

FIG. 5 is a sectional elevation showing a storage platform positioned on either space inside the storage structure. As illustrated, an individual storage platform 7 has horizontal rollers 71 on the bottom at four corners respectively inserted in pairs of parallel rails 35 on either space. Because the storage platform 7 (and cargo thereon, if any,) is supported on the four-way wheel assemblies 212, 312 or 313 or two-way wheel assemblies 214 or 314, rotating the wheel assemblies by a respective driving mechanism 213 (motor or the like) through the control of the programmed computer causes the storage platform 7 to be moved along the pairs of parallel rails 35 in longitudinal or transverse direction.

Figure 6:
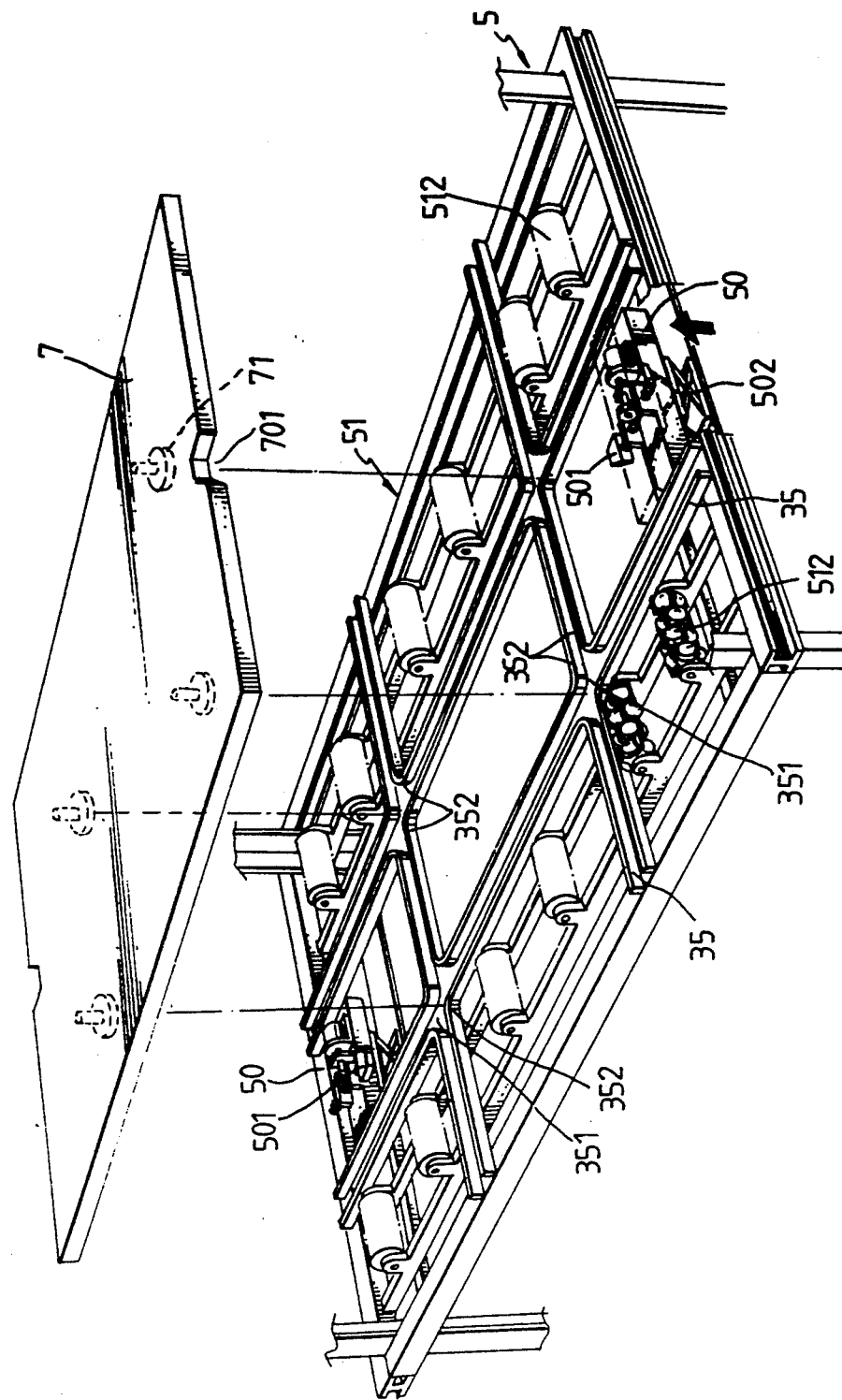
FIG. 6 is a perspective view of one register space of an elevator means according to the present invention.

Referring to FIG. 6, there is shown a perspective view of either register space of the elevator means 5. The elevator means 5 is a double-deck elevator having two register spaces 51 at different levels. Each register space 51 comprises a plurality of four-way wheel assemblies 512 arranged in longitudinal direction and two mechanical arms 50 on two opposite ends thereof respectively supported on a respective hydraulic lift 502. Each mechanical arm 50 has a movable locking block 501, which may be engaged with a corresponding notch 701 on the individual storage platform 7 being placed on the respective register space 51 and controlled by the programmed computer to move the storage platform 7 horizontally at a distance equal to the width of the register space 51. As the locking block 501 of each mechanical arm 50 of either register space 51 is respectively moved out and engaged with the corresponding notch 701 on the individual storage platform 7 on the same register space 51, the individual storage platform 7 is then moved along the corresponding pairs of parallel rails 35 in transverse direction to an adjacent space on the same level by the two mechanical arms 50 of the register space 51. The individual storage platform 7 may be moved in longitudinal direction by the four-way wheel assemblies 512 as each mechanical arm 50 was respectively lowered by the respective hydraulic lift 502 to a height below the four-way wheel assemblies 512. Once the mechanical arms 50 of either register space 51 are lowered to a height below the four-way wheel assemblies 512 of the respective register space 51, the four-way wheel assemblies 512 are controlled by the programmed computer to move the individual storage platform 7 in longitudinal direction along the corresponding pairs of parallel rails 35 to an adjacent space on the level in which the register space 51 resides.

Referring to FIGS. 2,3,6 again, pairs of parallel rails 35 are arranged on the structural steel elements on one each conveying space 31, cargo storage space 21 and register space 51 longitudinally and/or transversely according to the revolving direction of the respective two-way wheel assemblies and/or four-way wheel assemblies, with the pairs of parallel rails 35 on the same level interconnected by switching sections 351. As the horizontal rollers 71 of an individual storage platform 7 are inserted into the channel defined within the pairs of parallel rails 35, it can be moved from one space to another in longitudinal or transverse direction. Further, each switching section 351 has smoothly curved peripheral walls 352 terminated to respective pairs of parallel rails 35 in different directions. Through the smoothly curved peripheral walls 352, the horizontal rollers 71 of an individual storage platform 7 are guided from the pairs of parallel rails 35 on one space to another. Therefore, an individual storage platform 7 can be smoothly moved from one space to another even if there is a tolerable alignment error on the pairs of parallel rails 35 between two adjacent spaces.

Figure 7:
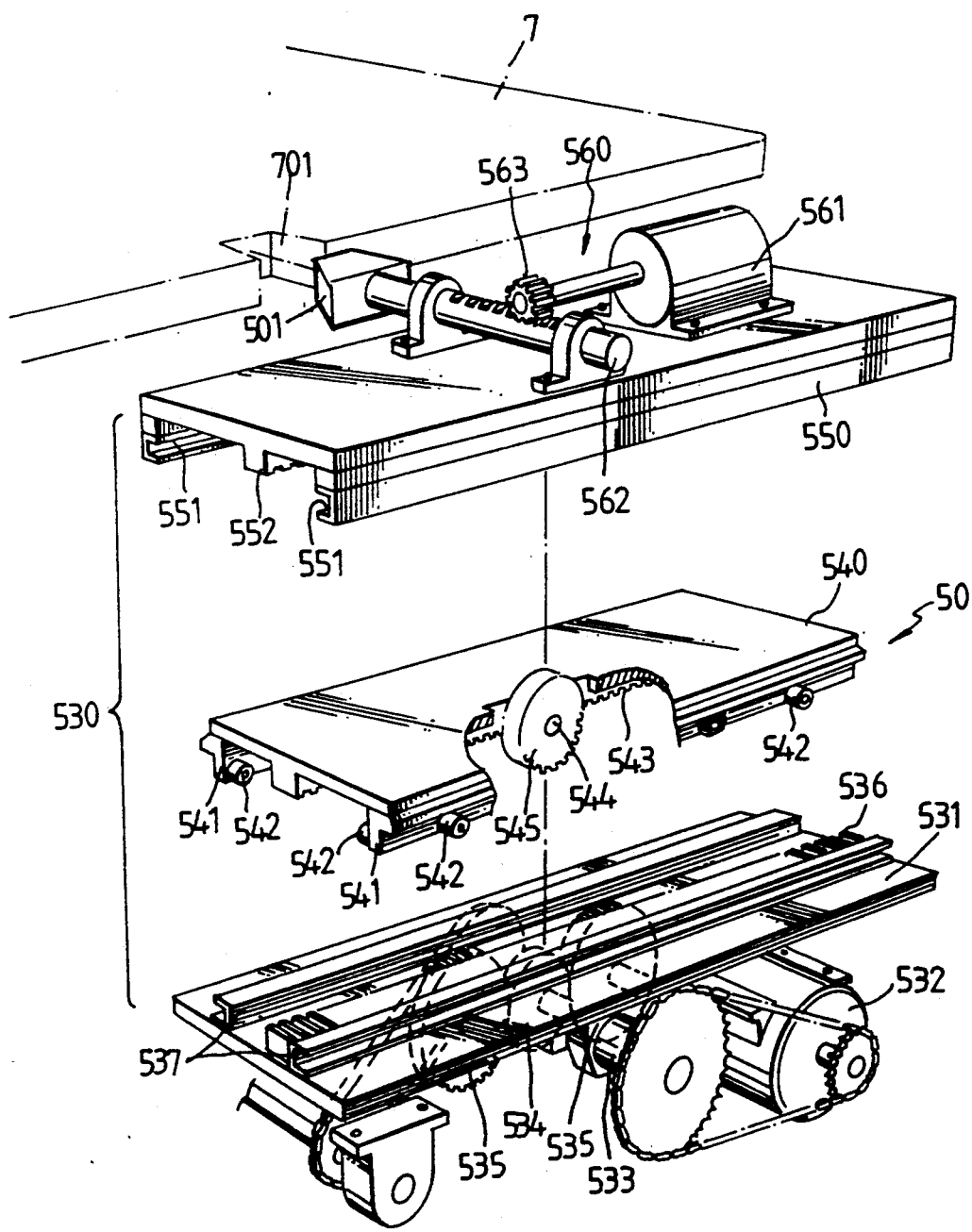
FIG. 7 is an exploded view of a mechanical arm according to the present invention.

Referring to FIG. 7, the mechanical arm 50 is generally comprised of a horizontal shifting mechanism 530 and a locking block reciprocating mechanism 560. The horizontal shifting mechanism 530 is fastened on a lateral structural steel 10 on either register space 51 of the elevator means 5, comprising a bottom plate 531, a top plate 550, and an intermediate plate 540 between the bottom plate 531 and the top plate 550.

The bottom plate 531 of the horizontal shifting mechanism 530 comprises a drive shaft 533 on the bottom driven by a reversible motor 532, a drive gear 534 on the drive shaft 533, two opposite driven gears 535 meshed with the drive gear 534 at two opposite locations, and a rack 536 between two channel grooved rails 537 on the top.

The intermediate plate 540 of the horizontal shifting mechanism 530 is disposed in parallel with the bottom plate 531 at the top, comprising two sets of wheel holders 541 to hold guide wheels 542, a bottom rack 543 meshed with the driven gears 535, a stub shaft 544 fastened to the bottom rack 543 at the middle, and an idle gear 545 mounted on the stub shaft 544 and meshed with the rack 536 on the bottom plate 531. The guide wheels 542 are respectively fastened to the wheel holders 541 at two opposite sides, namely; at the inner side and the outer side. The guide wheels 542 at the inner side are respectively engaged with the grooved rails 537 to support the intermediate plate 540 for permitting it to be moved horizontally along the grooved rails 537.

The top plate 550 of the horizontal shifting mechanism 30 is disposed in parallel with the intermediate plate 540 at the top, comprising two opposed grooved rails 551 along two opposite, longer sides thereof, which receive the outer guide wheels 542 for allowing the top plate 550 to be moved on the intermediate plate 540 horizontally, and a bottom rack 552 disposed in parallel with and between the grooved rails 551 and meshed with the idle gear 545 of the intermediate plate 540.

The locking block reciprocating mechanism 560 is mounted on the top plate 550 of the horizontal shifting mechanism 530 at the top, and comprised of a reversible motor 561 and a worm 562. The reversible motor 561 has a gear 563 on its output shaft meshed with the worm 562 at a right angle. The worm 562 has a locking block 501 moved into or out of either notch 701 on an individual storage platform 7.

The operation of the mechanical arm 50 is outlined hereinafter. The reversible motor 532 of the horizontal shifting mechanism 530 is controlled by the programmed computer to turn the driven gears 535 via the drive gear 534. Because the driven gears 535 are meshed with the bottom rack 543 of the intermediate plate 540, the intermediate plate 540 is moved on the bottom plate 531 horizontally as the driven gears 535 are being rotated. Because the idle gear 545 on the intermediate plate 540 is meshed with the rack 536 on the bottom plate 531, moving the intermediate plate 540 on the bottom plate 531 causes rotation of the idle wheel 545. Because the idle wheel 545 is meshed between the rack 536 on the bottom plate 531 and the rack 552 on the top plate 550, rotating the idle gear 545 causes horizontal movement of the top plate 550. As the top plate 550 is movably mounted on the intermediate plate 540 and the intermediate plate 540 is movably mounted on the bottom plate 531, the moving range of the top plate 550 is approximately twice that of the intermediate plate 540.

Before moving the horizontal shifting mechanism 530, the reversible motor 561 of the locking block reciprocating mechanism 560 is controlled by the programmed computer to drive the worm 562, via the gear 563, in moving the locking block 501 into the respective notch 701 on the individual storage platform 7 to be shifted. Once the locking block 501 was engaged into the respective notch 701, the horizontal shifting mechanism 530 is turned on to move the individual storage platform 7 horizontally.

Figure 8:
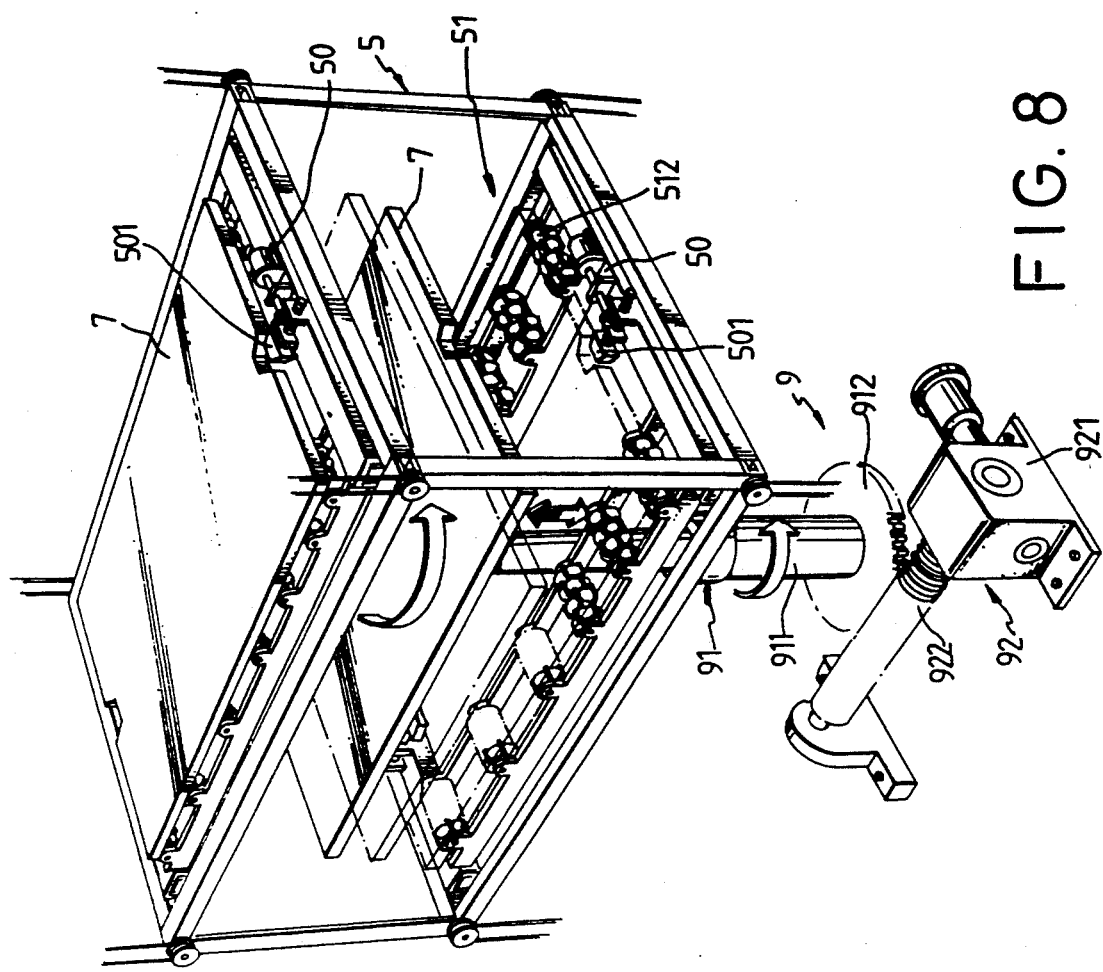
FIG. 8 illustrates a turning gear driven to turn a storage platform in a circle.

Referring to FIG. 8, there is shown a turning gear 9 according to the present invention, which is mounted on the access level within the elevator space. The turning gear 9 is generally comprised of a hydraulic lift 91 and a driving mechanism 92. The hydraulic lift 91 comprises a lifter 911 coupled with a driven gear 912. The output of the driving mechanism 92 of the turning gear 9 is transmitted to a worm 922 through a transmission gear box 921. The worm 922 meshes with the driven gear 912 of the hydraulic lift 91. Cargo on an individual storage platform 7 on the bottom register space 51 of the elevator means 5 can be turned from one direction to another by the turning gear 9 by means of the control of the programmed computer. The lifter 911 of the hydraulic lift 91 is controlled by the programmed computer to lift the storage platform 7 on the bottom register space 51 of the elevator means 5, and then the worm 922 is rotated by the transmission gear box 921 to turn the lifter 911 of the hydraulic lift via the driven gear 912, and therefore the storage platform 7 is turned to change the direction of the automobile thereon.

Figure 9:
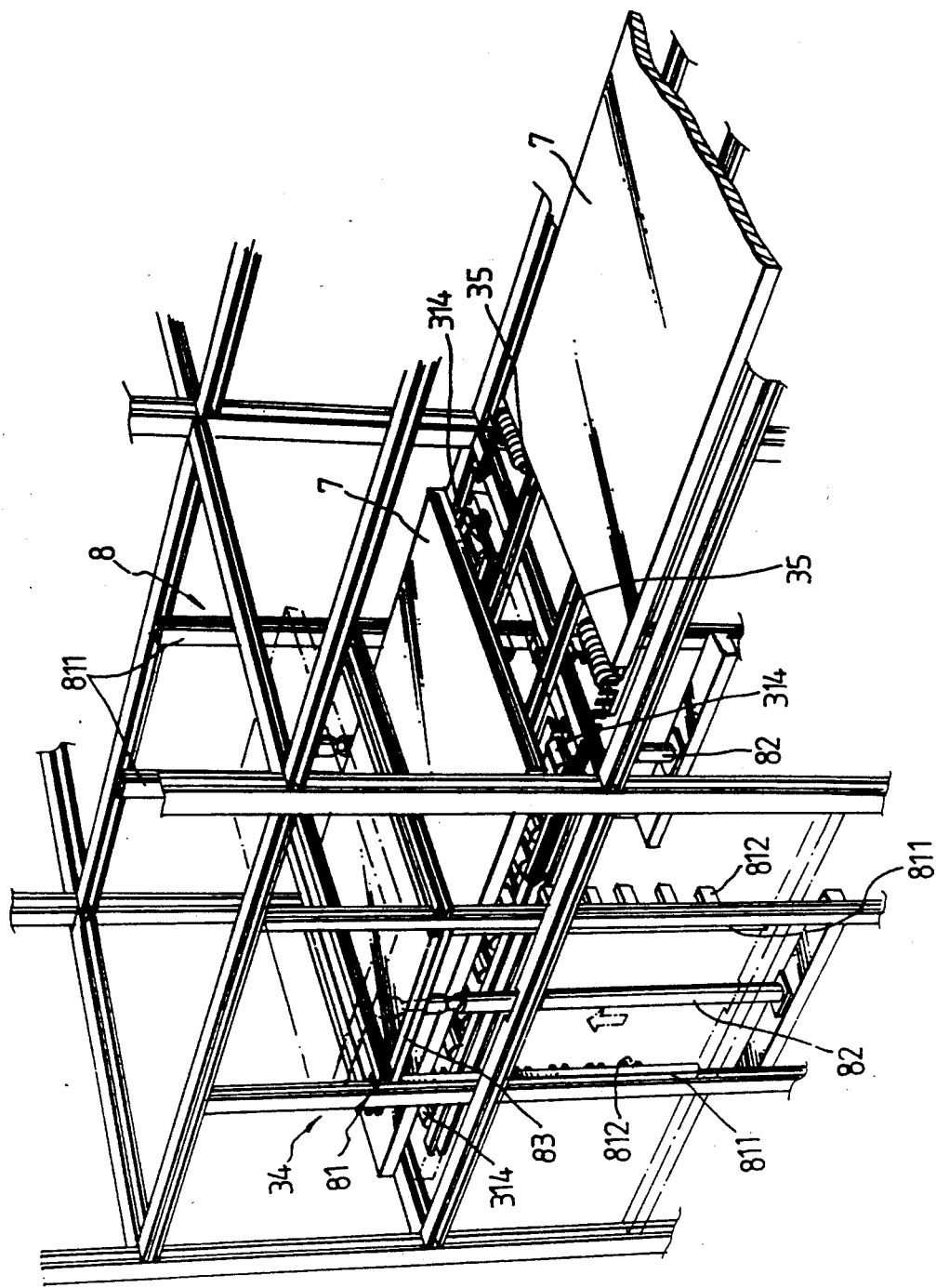
FIG. 9 is a perspective view of a platform storage device according to the present invention.

FIG. 9 is a perspective view of a platform storage device 8 according to the present invention. The platform storage device 8 is installed in either platform storage space 34 on the access level, and comprised of a platform storage rack 81 and two hydraulic cylinders 82. The platform storage rack 81 is vertically movably fastened to the structural steel elements of either platform storage space 34 on the inside, comprising two opposite pairs of posts 811 connected by a respective cross bars 83. Horizontal ribs 812 are symmetrically and horizontally made on the opposite pairs of posts 811 in dividing the holding space of the platform storage rack 81 into a plurality of horizontal storage spaces. The hydraulic cylinders 82 are respectively connected to the cross bars 83. Once an individual storage platform 7 was carried by the two-way wheel assemblies 314 of either platform storage space 34 into either horizontal storage space of the respective platform storage device 8, the hydraulic cylinders 82 are driven to lift the platform storage rack 81 for permitting the bottom edge of the next empty horizontal storage space of the platform storage rack 81 to be disposed flush with the two-way wheel assemblies 314 of the platform storage space 34 for receiving another individual storage platform 7 to be stored. On the contrary, the hydraulic cylinders 82 are moved in the reversed direction to lower the platform storage rack 81 for permitting a previously stored storage platform 7 to be carried away out of the platform storage rack 81 by reversing the two-way wheel assemblies 314 of the platform storage space 34.

Figure 10:
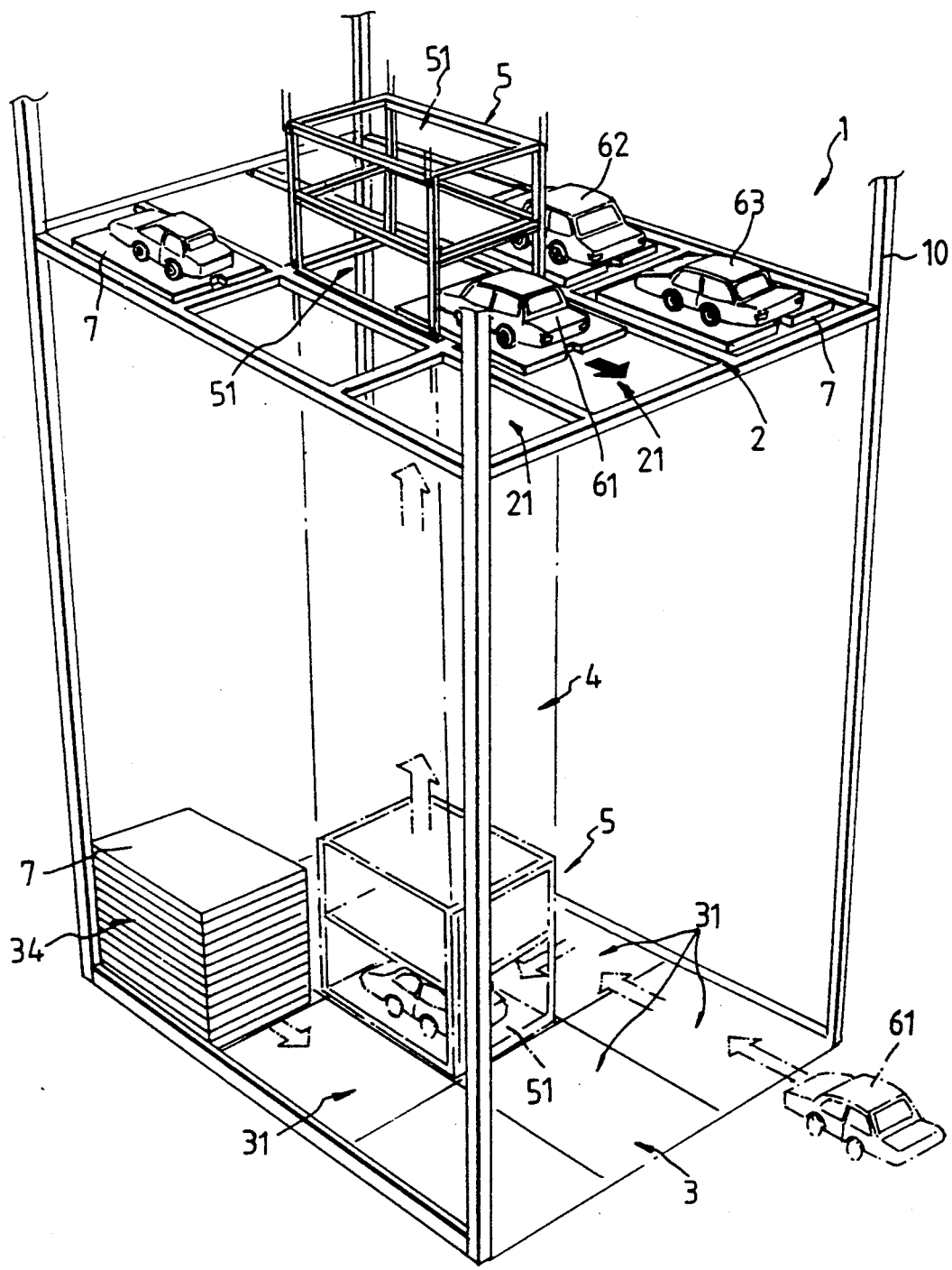
FIG. 10 is a schematic elevational view showing the operation of the storage system in moving an automobile into a desired cargo storage space.

All the driving and actuating elements of the storage system are controlled by the programmed computer of the system to operate in proper order to move cargo into or out of any one of the storage spaces efficiently. Therefore, the storage system of the present invention is suitable for storing automobiles. FIG. 10 is a schematic elevational view showing the operation of the storage system in moving an automobile into a desired cargo storage space. An individual storage platform 7 is moved out of either platform storage space 34 by the respective platform storage device (not shown) and then moved to the entrance of the storage structure by the four-way wheel assemblies of the conveying space 31. As soon as the automobile 61 to be stored is stopped on the storage platform 7, the storage platform 7 is immediately moved to the nearest conveying space 31 adjacent to the elevator means 5, then the storage platform 7 and the automobile 61 thereon are moved to the corresponding resister space 51 by the mechanical arms of the elevator device 5, and then the elevator means 5 is raised to the designated cargo storage level 2, and then the storage platform 7 and the automobile 61 thereon are moved to an adjacent cargo storage space by the mechanical arms or the corresponding four-way wheel assemblies and then moved from one cargo storage space to another, and therefore the storage platform 7 and the automobile thereon are finally moved into the designated cargo storage space.

Figure 11:
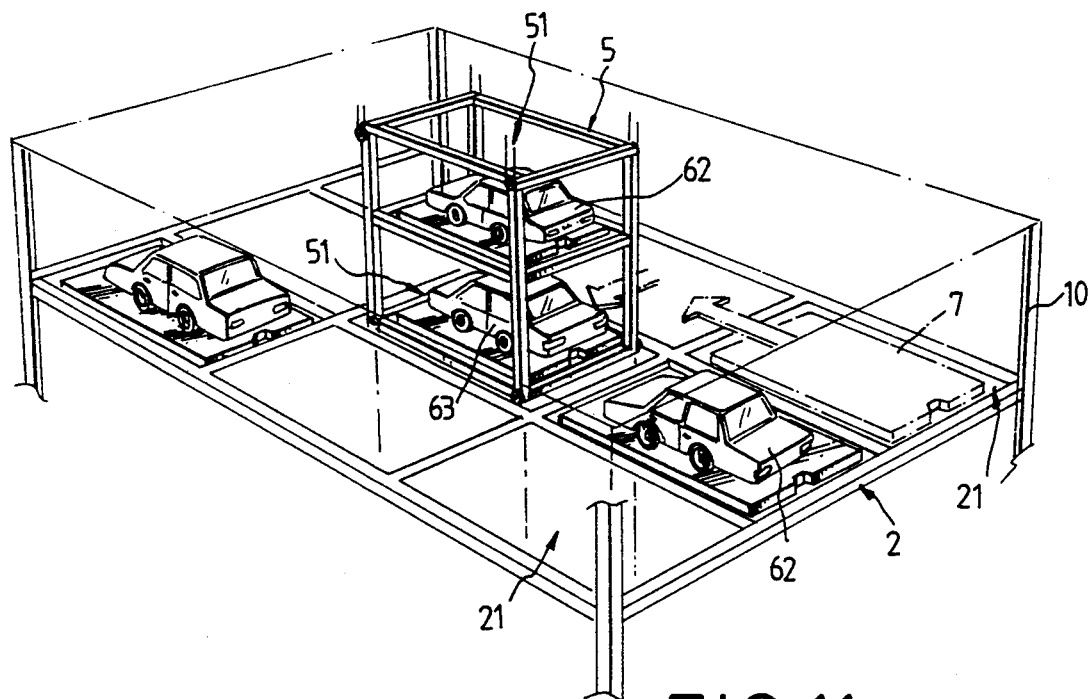
FIGS. 11 and 12 are schematic elevational views showing the operation of the storage system in moving an automobile from a cargo storage space to the elevator means of the storage system.
Figure 12:
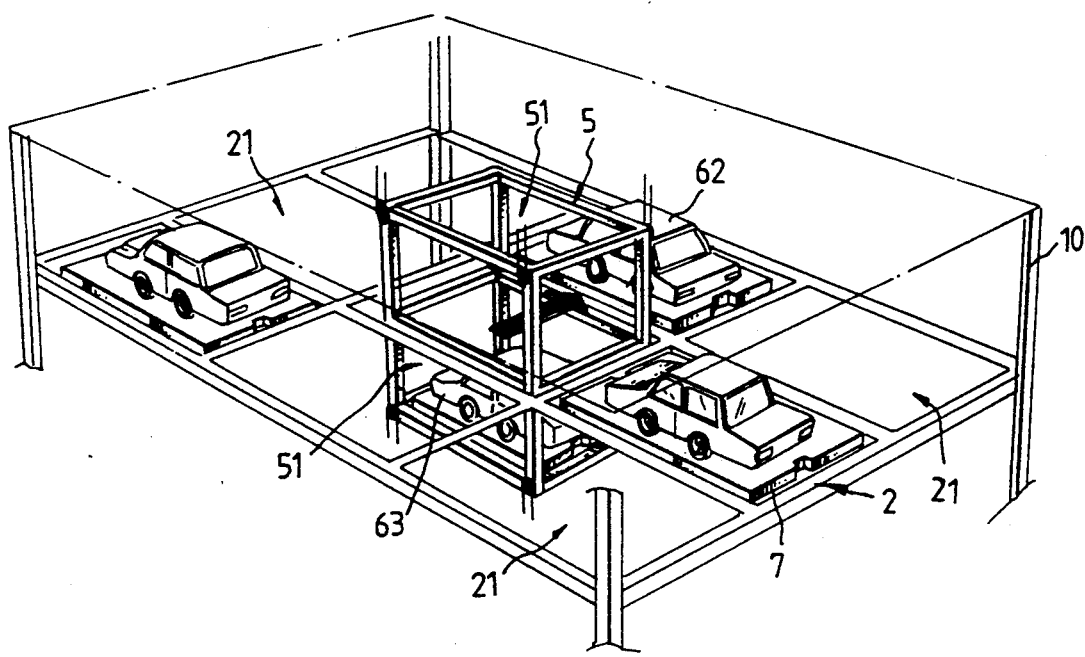

Referring to FIGS. 11 and 12, there is shown schematic elevational views showing the operation of the storage system in moving an automobile from a cargo storage space to the elevator means. If the storage item, namely, the automobile 63 is not stored in a cargo storage space 21 adjacent to the elevator means 5, the upper register space 51 shall be moved to the storage level in which the automobile 63 is stored so that the storage platform on an adjacent cargo storage space with its storage item (automobile) 62 can be moved to the tipper resister space of the elevator means to empty a cargo storage space for passing the automobile 63 to be retrieved and for letting the designated storage platform with the automobile 63 to be retrieved be moved to the lower resister space of the elevator means 5 after the lower resister space of the elevator means 5 has been moved to such storage level.

Figure 13:
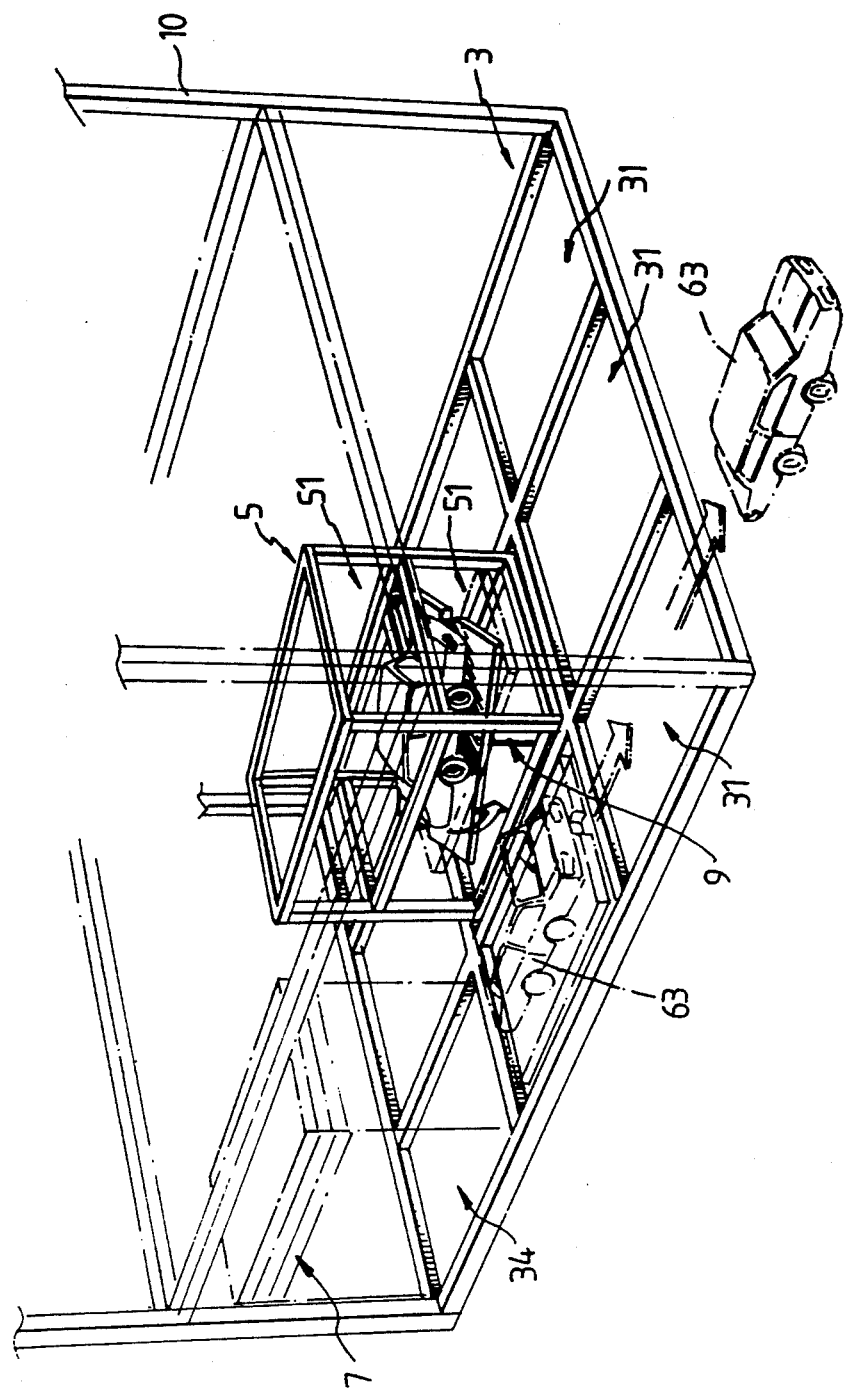
FIG. 13 is a schematic elevational view showing an automobile moved out of access level of the storage system.

Referring to FIG. 13, there is shown a schematic elevational view showing an automobile moved out of the access level of the storage system. The storage platform and the storage item 63 thereon are moved from the designated cargo storage space to the access level 3, then the turning gear 9 in the access level 3 inside the elevator space 4 is operated to turn the storage platform 5 and the storage item 63 to a desired direction, and then the storage platform is moved to carry the storage item 63 to the adjacent conveying space 31 according to the desired direction, and then the storage platform is moved by the four-way wheel assemblies of the corresponding conveying space 31 to the entrance.

The invention has been fully described by way of example. It is to be understood that various modifications and changes could be made without departing from the scope of the invention and the invention is not to be considered and limited to what is shown in the drawings and described in the specification. For example, any suitable reciprocating mechanism may be used to replace the hydraulic cylinders, and devices of similar functions may be used to replace the wheel assemblies, the mechanical arms, or the electric motors.

What is claimed is:

1. An automatic controlled multi-level storage system comprising a storage structure formed of structural steel elements and having an access level and at least one storage level and an elevator space, said access level and each of said at least one storage level having each a plurality of contiguous substantially rectangular spaces, wherein:

said access level is for moving cargo elements to be stored into a specific individual space on either storage level and retrieving them from the storage structure, having a center space formed into part of said elevator space, two opposite conveying spaces transversely aligned at two opposite sides adjacent to said elevator space, which comprises each a plurality of four-way wheel assemblies arranged in longitudinal direction and controlled to move individual storage platforms and cargo elements thereon into or out of the storage system, three conveying spaces respectively and longitudinally aligned with the aforesaid two opposite conveying spaces and said elevator space at one side, said three conveying spaces each comprise a plurality of four-way wheel assemblies arranged in longitudinal and transverse directions, and three platform storage spaces at an opposite side relative to said elevator space and the conveying space, said three platform storage spaces each comprise a plurality of two-way wheel assemblies arranged in longitudinal direction and controlled to move individual storage platforms into platform storage devices therein:

said at least one storage level is for storing cargo elements, said at least one storage level having a center space formed into part of said elevator space, two opposite cargo storage spaces transversely aligned at two opposite sides adjacent to said elevator space, which comprise each a plurality of four-way wheel assemblies arranged in longitudinal direction controlled to move individual storage platforms in longitudinal direction from one cargo storage space to another, three contiguous cargo storage spaces respectively and longitudinally aligned with the aforesaid two cargo storage spaces and said elevator space at one side, said three contiguous cargo storage spaces each comprise a plurality of two-way wheel assemblies controlled to move individual storage platforms in longitudinal direction;

said elevator space is disposed through said access level and said at least one storage level vertically and having elevator means for raising and lowering individual storage platforms and cargo thereon to a desired level, said elevator means comprising two register spaces vertically spaced corresponding to the spacing of the levels of said storage structure, each register space comprising a plurality of four-way wheel assemblies arranged in longitudinal direction, and two opposite mechanical arms at two opposite ends thereof respectively supported on a respective hydraulic lift, said mechanical arms being respectively lowered by said respective hydraulic lift for permitting individual storage platforms and cargo thereon, if any, to be moved longitudinally from either register space to an adjacent space on either level of the storage structure;

said access level and said at least one storage level each comprises pairs of parallel rails longitudinally and transversely interconnected with one another in directions corresponding to said four-way and two-way wheel assemblies for guiding horizontal rollers on individual storage platforms.

2. The storage system of claim 1, wherein an additional one or a number of conveying spaces may be installed in said access level to replace one or a number of said platform storage spaces, each additional conveying space comprising a plurality of four-way or two-way wheel assemblies.

3. The storage system of claim 1 wherein each platform storage space comprises a platform storage device consisted of a platform storage rack and a plurality of hydraulic cylinders, said hydraulic cylinders being to raise and lower said platform storage rack in the respective platform storage space, said platform storage rack comprising two opposite pairs of posts connected by a respective cross bars, and horizontal ribs on said posts directed toward the two-way wheel assemblies of the respective platform storage space for dividing a holding space of said platform storage rack into a plurality of horizontal storage spaces for storing individual storage platforms.

4. The storage system of claim 1 wherein said four-way and two-way wheel assemblies are respectively controlled by a respective driving mechanism, which can be a reversible motor.

5. The storage system of claim 1 wherein each mechanical arm of said elevator means is comprised of a horizontal shifting mechanism and a locking block reciprocating mechanism, said locking block reciprocating mechanism being mounted on said horizontal shifting mechanism and controlled to reciprocate a locking block for permitting it to be engaged into a respective notch on an individual storage platform for locking the individual storage platform to said horizontal shifting mechanism for horizontal displacement.

6. The storage system of claim 1 wherein said pairs of parallel rails are interconnected with one another by switching sections, each switching section having smoothly curved peripheral walls respectively terminated to either pair of parallel rails.

7. The storage system of claim 1 which further comprises a turning gear having a hydraulic lift and a driving mechanism, said hydraulic lift having a lifter controlled to raise and lower an individual platform and cargo thereon and a bottom coupled with a driven gear driven by the driving mechanism to turn said lifter in a circle.

* * * * *